March 11, 1952   R. G. PICARD   2,588,569
SELF-SUPPORTING, LUMINESCENT FILMS
Filed Jan. 30, 1948
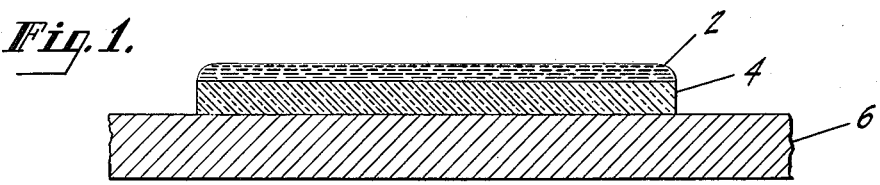
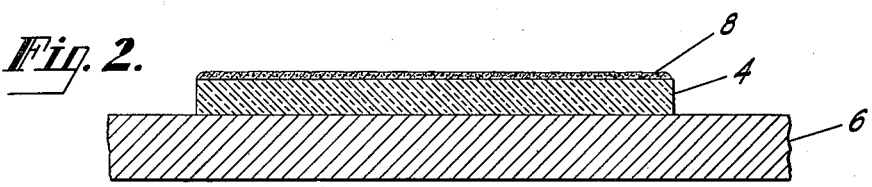
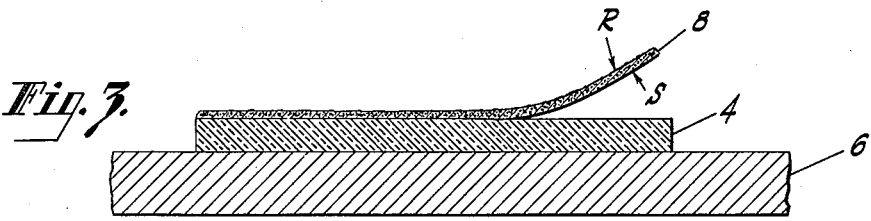
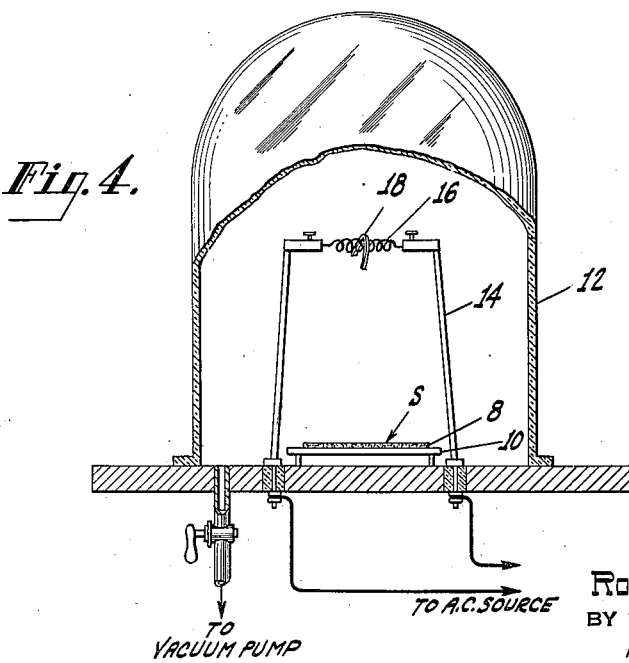
INVENTOR
ROBERT G. PICARD
BY
ATTORNEY Patented Mar. 11, 1952

2,588,569

UNITED STATES PATENT OFFICE 2,588,569

SELF-SUPPORTING LUMINESCENT FILMS

Robert G. Picard, Collingswood, N. J., assignor to Radio Corporation of America, a corporation of Delaware Application January 30, 1948, Serial No. 5,443

2 Claims. (Cl. 18—59)

The present invention relates generally to methods of producing self-supporting, luminescent films or pellicles. More particularly, the invention relates to the production of self-supporting luminescent films backed with a thin film of an electron permeable metal.

It has been known that the light intensity from electron activated fluorescent screens intended for transmission viewing can be materially increased by placing an electron transparent mirror behind and in contact with the luminescent material. The screen is activated by the electrons passing through the backing material, and light from the activated luminescent substance which would normally return toward the source of electrons is reflected by the mirror surface to augment the light that would normally pass forward through the luminescent substance to the observer. The backing material must be in contact with the luminescent substance to maintain image sharpness and must be a good mirror or else merely acts as an electron absorber and reduces intensity.

Methods have previously been devised for preparing such screens for television tubes, and usually, they have involved the the following steps:

1. Preparing a suspension of phosphor in an aqueous medium containing a binder such as sodium silicate, placing the suspension on the face of the tube to be coated, settling out the phosphor, decanting the excess liquid, drying and baking.

2. Covering the resulting luminescent screen with water, spreading a thin collodion film on the water, and draining the water to leave the collodion film on the phosphor. This film has a mirror surface.

3. Evaporating aluminum onto the collodion. This film must be thin enough to transmit electrons with little loss of energy, but thick enough to reflect substantially all light falling upon it.

4. Baking the tube at high temperature in an oxidizing atmosphere to completely remove the collodion.

The screen which results from a method such as described above is satisfactory but has some disadvantages when used in demountable vacuum systems, such as electron microscopes, and steps 2 and 4 are very difficult to perform with consistent results. If the collodion film has any holes, no mirror will be formed for this area. After baking, the screen is not tightly held to the phosphor and is readily damaged by the slightest air gust. Touching the aluminum at any point removes it and, thus, destroys the screen at that point. The larger, more efficient particles of the phosphor lie farthest from the metal backing film which results in considerable loss in efficiency since the electron beam passes from back to front through the layer of phosphor.

The method of the present invention overcomes all of the above disadvantages, makes a highly efficient screen which is rugged and readily handled. The screen can be pasted onto glass for transmission viewing and is, moreover, very simple to prepare.

One object of the present invention is to prepare an improved luminescent screen having an electron permeable metallic backing, which screen is more efficient than screens previously produced.

Another object of the invention is to prepare an improved fluorescent screen having an electron permeable metal backing and a layer of phosphor material which may have particles of various sizes and in which the larger size particles will be closest to the backing layer.

Another object of the invention is to provide an improved luminescent screen which may be readily handled and transported without damage.

Another object of the invention to provide a luminescent screen which is self-supporting and which may be pasted on the viewing window of an electron optical device.

Another object of the invention is to provide an improved method of preparing self-supporting luminescent screens having a backing of light reflecting electron permeable metal.

These and other objects will be more readily apparent and the invention will be better understood from the following specification taken in connection with the drawings, of which Figure 1 is a cross section view showing a suspension of phosphor covering the polished surface of a body.

Figure 2 is a similar view showing the article of Figure 1 with the film in a dried condition adhering to the polished surface.

Figure 3 is another similar view illustrating how the film is separated from the polished surface of the temporary support, and Figure 4 is a diagrammatic, longitudinal section view of one form of apparatus suitable for applying the metal backing film to the previously prepared film of luminescent material.

The following are more specific examples of modifications in the process of the present invention:

Example 1

To 5 cc. of a 1 per cent solution of nitrocellulose in a mixture of amyl acetate, butyl acetate and toluene is added 0.5 gram of a zinc sulphide-cadmium sulphide phosphor in pulverized form. The suspension 2, thus prepared, is flowed evenly over the polished surface of a glass plate 4 having a diameter of 4 inches. The glass plate is supported on a perfectly flat surface 6. The phosphor is permitted to settle out of the suspension and the solvent liquid permitted to evaporate slowly. The damp film is allowed to dry for at least 1 hour in a dust free atmosphere resulting in the formation of a dry film 8 consisting of phosphor and a relatively small proportion of binder. In the dried film, the proportion of phosphor to binder may range between approximately 12 to 1 and approximately 4 to 1 by weight for best results. The proportions may be somewhat higher or somewhat lower but if the proportions differ a great deal from this range, the results will not be nearly as satisfactory. If the amount of binder is too high, it will absorb too much of the electron energy and the suspension will be too thick for the phosphor to settle properly. If the proportion of binder is too low, the resulting film is very difficult to separate from the polished surface without injuring it.

Next, the dried film is separated from the polished surface of the supporting body by immersing in water. This loosens the film and it may be easily separated from the glass plate without injury. The separated film is then dried.

It will be seen that the luminescent film has one side (S) which is just as smooth as was the surface of the supporting body against which it was cast. In other words, the film surface (S) is a replica of the supporting surface and therefore may be termed specular. The other side (R) is somewhat rougher due to the effect of the evaporating solvent.

The next step is to evaporate a thin film of aluminum onto the smooth surface (S) of the luminescent film. This may be accomplished, using apparatus such as used in Figure 4. The film is laid on a suitable support 10 with the smooth side (S) facing upward. The support 10 and the film are positioned within a vacuum chamber 12. Within the vacuum chamber are suitable electrically conducting supports 14, between which is a heater wire filament 16. Upon this filament may be placed pieces of metal 18 which are to be evaporated.

The evaporating technique, such as used in the present process, is well known.

The heater filament is raised to a high temperature which melts the coating metal and then evaporates it in all directions. The film of metal is thus deposited on the smooth surface of the luminescent film. In general, just sufficient metal is evaporated onto the surface of the film to make it opaque to visible light but still permeable to a beam of electrons. The optimum thickness of coating has been found to be from 1,000 to 2,000 Å. If the film is substantially thinner than 1,000 Å, it will not be completely opaque to light and if it is thicker than 2,000 Å, an increasing proportion of the electron energy will be absorbed in the metallic coating.

Various modifications may be made in the above example without departing from the spirit of the invention. For instance, any of the common phosphor materials may be used, such as tungstates, oxides, selenides, silicates. The particular phosphor is not at all critical. Various solvents other than those mentioned in the above example may be emloyed. For example, methyl ethyl ketone or nitropropane may be used in place of the amyl acetate. In fact, any suitable organic solvent for nitrocellulose may be used, although less satisfactory results are obtained with a very volatile solvent such as acetone, while much better results are obtained with solvents which do not evaporate as rapidly.

It is also possible to use a wide variety of binding materials. In addition to nitrocellulose, any other cellulose derivative may be employed, such as cellulose acetate, cellulose butyrate, or a mixed ester, such as cellulose acetate butyrate. It is also possible to use any of the cellulose ethers, such as ethyl cellulose. Bonding agents, other than cellulose compounds may also be used, as, for example, any of the various synthetic resinous materials such as polymethyl methacrylate, polyvinyl chloride, polyvinyl chloride acetate, polyvinyl formal, alkyd resins or silicone resins, such as methyl silicone. It is also possible to use natural resins, such as shellac, in highly purified form. Since it is not desirable to introduce any coloring material into the film, the natural resin must be refined carefully in order to remove any contaminants. In each case, it is only necessary to select the proper high boiling solution or mixture of solvents for best results and to prepare a suspension containing a suitable amount of the phosphor. For best results, it is preferred to use about 1 gram of phosphor to 10 cc. of solution, although this may be varied. For example, any lesser amount of phosphor may be used if the preparation of a screen having maximum efficiency is not required. When the amount of phosphor is much higher than 1 gram in 10 cc., however, the suspension becomes unduly thick and cannot be flowed well over the surface of the supporting body.

*Example 2*

Another modification of the method described in Example 1 comprises preparing a phosphor suspension, as described in Example 1, and casting it on a clean mercury surface. After drying, the screen can be lifted from the mercury without wetting it and the contact surface will be a mirror surface ready to receive the coating of metal.

*Example 3*

Another modification of the method consists in providing a piece of a soluble material, such as rock salt, with a polished surface, evaporating aluminum onto it to form a mirror, pouring on the mirror surface a phosphor suspension, such as described in Example 1, and allowing it to dry. The base material can then be dissolved off with water, which will not damage the metal backed luminescent screen. This variation is particularly suitable for preparing small areas of screen. In addition to rock salt, other inorganic or organic crystalline substances, soluble in water, may be used as the temporary base material. For example, silver nitrate, Rochelle salts or pentaerythritol are almost equally good. The same type of technique may also be used in a somewhat different manner. The backing metal may be deposited upon a thin plate of a synthetic resin having a polished surface. The phosphor suspension such as described in Example 1 may then be flowed over the metal surface, allowed to dry and finally separated by dissolving off the resinous backing material. Of course, the synthetic resin utilized for the temporary base must be soluble in solvents which do not attack the resinous binder for the phosphor. When the binder is any of the cellulose derivatives, for example, the temporary base material may be polystyrene. Polystyrene is soluble in solvents such as benzol, toluol, xylol, ethylene dichloride and trichlorethylene which do not dissolve the cellulose derivatives. Alternatively, when cellulose derivatives are used as the phosphor binder, polymethyl methacrylate may be used as the temporary base material since the methacrylate polymers are soluble in all of the above mentioned solvents for polystyrene except trichlorethylene and, in addition, are soluble in butanol and higher alcohols. Since polyvinyl chloride is not soluble in certain of the hydrocarbon solvents which dissolve polystyrene and polymethyl methacrylate, it, too, may be used as the phosphor binder. It will be appreciated that, in general, the resinous or resin-like binder for the phosphor must, itself, be soluble in some organic solvent and that some temporary base material must be selected which is soluble in a solvent that does not dissolve nor appreciably attack the binder; also that the binder solvent must not appreciably attack the temporary base material. Within this general category, those skilled in the technology of synthetic resinous materials will be able to select many other combinations.

Although aluminum is preferred for the backing metal in all of the above processes, this is not the only metal which may be used. In order to be useful in the process, the metal must have a low atomic weight, provide a good reflecting surface, and not be too easily oxidized so that it is changed when exposed to air. In other words, the metal must be chemically stable and readily permeable to electrons in thicknesses which are opaque to light. Another metal which meets these specifications is beryllium. Magnesium may also be used but it is much less satisfactory in forming uniform reflecting films.

It will also be readily understood that polished surfaces of materials other than glass may be used in the modification of the process described in Example 1. For example, any polished metal surface may be used, such as that of chromium, nickel or steel. In any of the above modifications, the resin-like binder may be present in the form of a 1 to 2½ per cent solution for best results. The optimum percentage appears to be about 1 per cent. It will further be understood that the form of apparatus illustrated and described is but one illustration of the type of apparatus which might be used to produce the metal backing on the film. Any method of depositing molecularly dispersed metal can be utilized.

In all of the above modifications, the product has one distinct advantage not possessed by previous metal backed screens prepared for the same purpose. It is well known that in a suspension containing particles of different sizes, the larger particles tend to settle out first. It is also well known that phosphors, in general, have the peculiarity that their larger particles are much more efficient in their ability to luminesce than are the smaller particles. Thus, in the present processes, the larger particles are concentrated closer to the smooth surface of the screen upon which the metal is evaporated, while the smaller particles are concentrated nearest the rough side. When the screen is placed in the electron optical instrument, the electron beam strikes the side of the screen having the particles of highest luminescence efficiency which raises the intensity of the light given off by the screen toward the observer. In previous screens, the larger size particles have been concentrated near the surface of the screen farthest from the metal backing.

There have thus been described improved methods of preparing metal backed self-supporting, luminescent screens and improvements in the screens, themselves. Screens made by any of the above modifications may be handled like sheets of paper. They thus adapt themselves particularly well to certain special uses where it is not desired to build the fluorescent screen into the apparatus. This is a requirement of fluorescent screens used in small table model electron microscopes. When a screen has been used for a period of time and its efficiency has been lowered by continued use, it may, be quickly and easily replaced at small cost and with almost no loss of time.

I claim as my invention:

1. A method of making a self-supporting, luminescent screen comprising settling a suspension of luminescent substance in a solution of a resinous bonding material against a polished surface of a body and evaporating said solution to dryness whereby a film of said luminescent substance and said bonding material is formed having a specular undersurface, separating said film from the polished surface of said body, and depositing on the specular undersurface of said film an electron permeable, light opaque layer of metal.

2. A method of making a self-supporting, luminescent screen comprising forming a film comprising a luminescent substance and a resinous bonding material, said film having particles of said substance of relatively larger size concentrated closer to one face of said film, providing said face with a specular surface and providing said surface with an electron permeable, light opaque coating of metal.

ROBERT G. PICARD.

REFERENCES CITED

The following references are of record in the file of this patent:

UNITED STATES PATENTS

| Number | Name | Date |
|---|---|---|
| 1,532,782 | Sheppard et al. | Apr. 7, 1925 |
| 2,181,305 | Myers | Nov. 28, 1939 |
| 2,219,700 | Perrin et al. | Oct. 29, 1940 |
| 2,233,786 | Law | Mar. 4, 1941 |
| 2,274,901 | Kallmann | Mar. 3, 1942 |
| 2,303,563 | Law | Dec. 1, 1942 |
| 2,347,965 | Ramberg | May 2, 1944 |
| 2,357,950 | Goessling | Sept. 12, 1944 |